C. Lobdell,
Horse Hoe.
No. 87,347. Patented Mar. 2, 1869.

Witnesses;
W. H. Ellis
Samuel A. Low.

Inventor;
Calvin Lobdell
By his Attorney
G. D. Chapin

CALVIN LOBDELL, OF FORT HILL, ILLINOIS.

Letters Patent No. 87,347, dated March 2, 1869.

IMPROVEMENT IN HORSE-HOE.

The Schedule referred to in these Letters Patent and making part of the same.

*To all whom it may concern:*

Be it known that I, CALVIN LOBDELL, of Fort Hill, in the county of Lake, and State of Illinois, have invented an "Improved Horse-Hoe and Leveller;" and I do hereby declare that the following is a full, clear, and exact description thereof, which will enable others skilled in the art to make, and use the same, reference being had to the accompanying drawings, and letters marked thereon, making a part of this description, in which—

Figure 1:
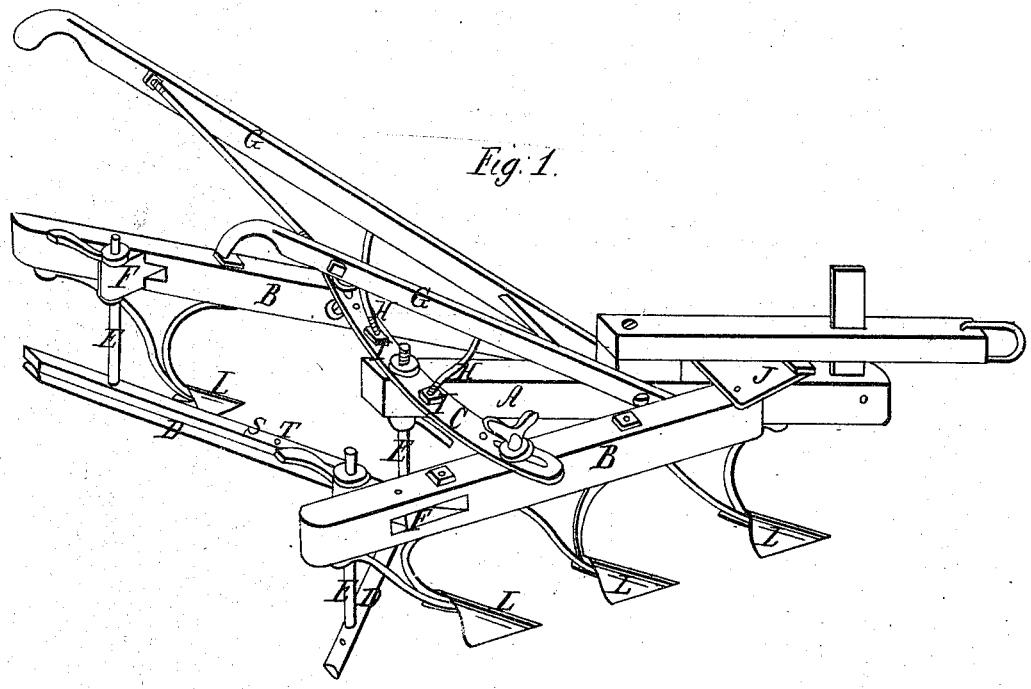

Figure 1 is a perspective representation of my improved implement.

Figure 2:
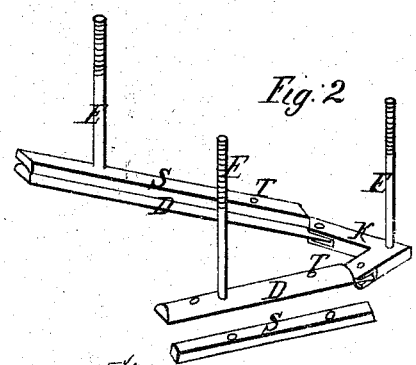

Figure 2, a perspective representation of the leveller with my hilling-device attached.

The nature of the present invention consists in so improving the cultivator and leveller, for which Letters Patent were granted to me on the 1st day of December, 1868, as to adapt the leveller therein shown and described to hilling rows.

This is accomplished by placing on the top of the leveller what I term a hiller, which is made of wood or other suitable material, and projects up far enough to throw the soil to the hills, as the horse-hoe moves along.

A represents the draught-beam of the hoe, which has wing-pieces B, supporting shovels L, hinged to it similarly to the cultivator referred to in said patent.

D K E also shows the same kind of a leveller, and F, the same kind of pivoted-arm supports. These parts, therefore, need no particular description.

The leveller, as patented, is designed only to pulverize clods, shear the surface of the soil, and make it level; consequently it is made quite thin, in order that weeds may fall back of it when it is in operation; but by placing pieces of scantling on the top sides of its two wings, and securing them by the rear rods E and bolts T, put through their forward ends, a hiller is provided which will throw the soil cut loose by the leveller, up to the rows, and at the same time permit the leveller to do its work between them equally as well as when no hiller is used.

A very great advantage is gained by the use of the combined leveller and hiller, inasmuch as nearly all of the soil loosened by the leveller is thrown to the rows, while at the same time the spaces between the hills are left smooth and even, thereby preventing water from settling much more in one place than in another.

I am not particular as to the construction of the wings of the hiller, only so that their outer sides are made high enough to move the loose soil.

Neither is it important that they be constructed of wood, this material being preferred, however, in view of its cheapness.

In the drawings, one wing of the hiller is represented as being removed from the leveller, to show its construction more clearly.

The other improvement referred to in the nature of the invention consists in pivoting the handles G G to the draught-beam A, and supporting them by adjustable braces, or rods, H, fig. 1, which pass through the ordinary curved plate C, and are so arranged, by means of screw-threads cut in their lower ends, that nuts $ff$, which support them, may be turned up on them, and allow the handles to have such an inclination as will suit the operator.

This arrangement is important, inasmuch as persons of different heights frequently have to operate the same implement, consequently they could work to much better advantage by means of this adjustment.

Having thus fully described my invention,

What I claim, and desire to secure by Letters Patent of the United States, is—

The hiller S S, attached to the leveller, as and for the purpose set forth.

CALVIN LOBDELL.

Witnesses:
 W. H. ELLIS,
 SAMUEL A. LOW.